(12) United States Patent
Huang (10) Patent No.: US 7,571,926 B2
(45) Date of Patent: Aug. 11, 2009

(54) FOLDABLE TOY STROLLER

(76) Inventor: Ming-Tai Huang, 4th Fl., No. 302, Chengteh Rd., Sec. 7, Taipei (TW)

( * ) Notice: Subject to any disclaimer, the term of this patent is extended or adjusted under 35 U.S.C. 154(b) by 220 days.

(21) Appl. No.: 11/776,739

(22) Filed: Jul. 12, 2007

(65) Prior Publication Data

US 2009/0014985 A1    Jan. 15, 2009

(51) Int. Cl.
*B62B 7/06* (2006.01)
(52) U.S. Cl. .................. 280/647; 280/650; 280/642
(58) Field of Classification Search .......... 280/642, 280/647, 650
See application file for complete search history.

(56) References Cited

U.S. PATENT DOCUMENTS

| | | | | |
|---|---|---|---|---|
| 5,558,357 | A * | 9/1996 | Wang | 280/647 |
| 6,095,548 | A * | 8/2000 | Baechler | 280/650 |
| 6,105,998 | A * | 8/2000 | Baechler et al. | 280/650 |
| 6,428,034 | B1 * | 8/2002 | Bost | 280/650 |
| 6,572,133 | B1 * | 6/2003 | Stevens | 280/642 |
| 6,811,178 | B2 * | 11/2004 | Tomasi et al. | 280/650 |
| 6,918,608 | B2 * | 7/2005 | Crisp | 280/642 |
| 7,364,182 | B2 * | 4/2008 | Jane Santamaria | 280/642 |
| 2007/0246916 | A1 * | 10/2007 | Hou | 280/642 |
| 2008/0054601 | A1 * | 3/2008 | Li | 280/642 |
| 2008/0061534 | A1 * | 3/2008 | Chen | 280/647 |
| 2008/0211206 | A1 * | 9/2008 | Thorne et al. | 280/650 |
| 2008/0224450 | A1 * | 9/2008 | Van der Vegt | 280/642 |
| 2008/0224451 | A1 * | 9/2008 | Vegt | 280/642 |
| 2009/0008907 | A1 * | 1/2009 | Huang | 280/642 |
| 2009/0014985 | A1 * | 1/2009 | Huang | 280/647 |

FOREIGN PATENT DOCUMENTS

EP    1466810    10/2004

* cited by examiner

*Primary Examiner*—Jeffrey J Restifo
(74) *Attorney, Agent, or Firm*—Alan Kamrath; Kamrath & Associates PA (57) ABSTRACT

A foldable toy stroller includes two main rods and two extension rods whose upper ends are mounted to lower ends of the main rods. Lower ends of the extension rods are rotatably mounted to two ends of a front-wheel base. A sliding seat is slidably mounted on a central rod having an end connected to the front-wheel base. Two rear wheel support rods are provided and each include a first end pivotably connected to the front wheel base and a second end to which a rear wheel is mounted. Pivotably connected to the sliding seat are two struts whose upper ends are pivotably connected to upper ends of the main rods. Two connecting rods are pivotably connected between the rear wheel support rods and the sliding seat. Each rear wheel support rod and each connecting rod are pivotable toward or away from the central rod for folding or unfolding operation.

9 Claims, 9 Drawing Sheets

FOLDABLE TOY STROLLER

BACKGROUND OF THE INVENTION

The present invention relates to a toy stroller and, more particularly, to a foldable three-wheel toy stroller.

Strollers for carrying babies or toy strollers for carrying dolls generally include two handles, a frame, and wheels. To allow easy carriage or storage when not in use, the frame generally includes joints that are pivotable to allow folding and that can be locked when folded or extended. The frames of toy strollers are generally folded in the front/rear direction in which the front and rear wheels are adjacent to each other after folding. However, it is difficult to minimize the folded volumes of four-wheel toy strollers foldable in the front/rear direction, which is inconvenient to storage and transport. In addition to weak structure, the frames of currently available three-wheel toy strollers can not allow easy folding operation while occupying a larger space after folding.

It is therefore a need in a foldable frame for a toy stroller that can be folded to a minimized volume for easy storage and transport.

BRIEF SUMMARY OF THE INVENTION

The present invention solves this need and other problems in the field of foldable frames for toy strollers by providing, in a preferred form, a foldable stroller including two main rods and two extension rods each having an upper end mounted to a lower end of one of the main rods and a lower end rotatably mounted to an end of a front-wheel base to which a front wheel is mounted. A central rod includes a first end connected to the front-wheel base and a second end to which a locking member is mounted. A sliding seat is slideably mounted on the central rod and includes a positioning hole for receiving a locking portion of the locking member. Two rear wheel support rods are provided and each include a first end pivotably connected to the front wheel base and a second end to which a rear wheel is mounted. Pivotably connected to the sliding seat are two struts whose upper ends are pivotably connected to upper ends of the main rods. Two connecting rods are pivotably connected between the rear wheel support rods and the sliding seat. Each rear wheel support rod and each connecting rod are pivotable away from the central rod for unfolding the foldable toy stroller or toward the central rod for folding the foldable toy stroller.

The locking portion of the locking member is engaged in the positioning hole of the sliding seat when the foldable toy stroller is in an extended state. The struts are away from the central rod and stretch the main rods upward. The connecting rods are away from the central rod and stretch the rear wheel support rods outward away from the central rod.

The sliding seat is slidable on the central rod when the locking portion of the locking member is disengaged from the positioning hole of the sliding seat, allowing the main rods, the rear wheel support rods, the struts, and the connecting rods to pivot toward the central rod for folding the foldable toy stroller.

In the most preferred form, the sliding seat includes four connecting portions to which the lower ends of the struts and the second ends of the connecting rods are pivotably connected. The sliding seat includes a longitudinal hole that slideably receives the central rod. The positioning hole of the sliding seat is in communication with and transverse to the longitudinal hole. The sliding seat further includes a guiding groove extending parallel to the longitudinal hole and in communication with the positioning hole. The locking portion is slideable in the guiding groove when the sliding seat is slideable on the central rod. A spring is mounted in the central rod for biasing the locking portion and an engaging portion of the locking member to respectively engage with the positioning hole of the sliding seat and an engaging hole of a handle mounted on the central rod. A push button is received in the engaging hole of the handle and can be pressed to disengage the engaging portion of the locking member from the engaging hole of the handle and to disengage the locking portion of the locking member from the positioning hole of the sliding seat to allow sliding movement of the sliding seat along the central rod. A front wheel is attached to a vertical portion extending downward from an intermediate portion between the ends of the front-wheel base. A horizontal portion extends horizontally from the intermediate portion and includes an end to which a coupler is mounted. The first end of the central rod is coupled to the coupler. The coupler further includes two pairs of lugs on an outer periphery thereof, and the front end of each rear wheel support rod is pivotably received between a pair of lugs. A stud extends outward from an end face of each end of the front-wheel base an acute angle with a longitudinal axis of the central rod. The lower end of each extension rod includes an eccentric hole parallel to and spaced from a central portion thereof. Each stud rotatably extends through the eccentric hole of the lower end of one of the extension rods.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terns "first", "second", "lower", "upper", "front", "rear", "inner", "outer", "end", "portion", "horizontal", "vertical", "inward", "outward", "longitudinal", "transverse", "width", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A foldable toy stroller according to the preferred teachings of the present invention is shown in the drawings and generally designated 10. The foldable toy stroller 10 includes a pair of main rods 1 to which a piece of cloth 16 is attached for providing a seat and a backrest for a doll or a baby. A handgrip 13 is mounted to an upper end 11 of each main rod 1. Also mounted to the upper end 11 of each main rod 1 and below the handgrip 13 is a coupler 14. A pair of links 5 is mounted between the couplers 14. Inner ends of the links 5 are pivotably connected together and pivotable about a pivot axis 150. Outer ends of the links 5 are respectively and pivotably connected to the couplers 14. The links 5 are substantially in the same line when the foldable toy stroller 10 is in its extended state.

Figure 1:
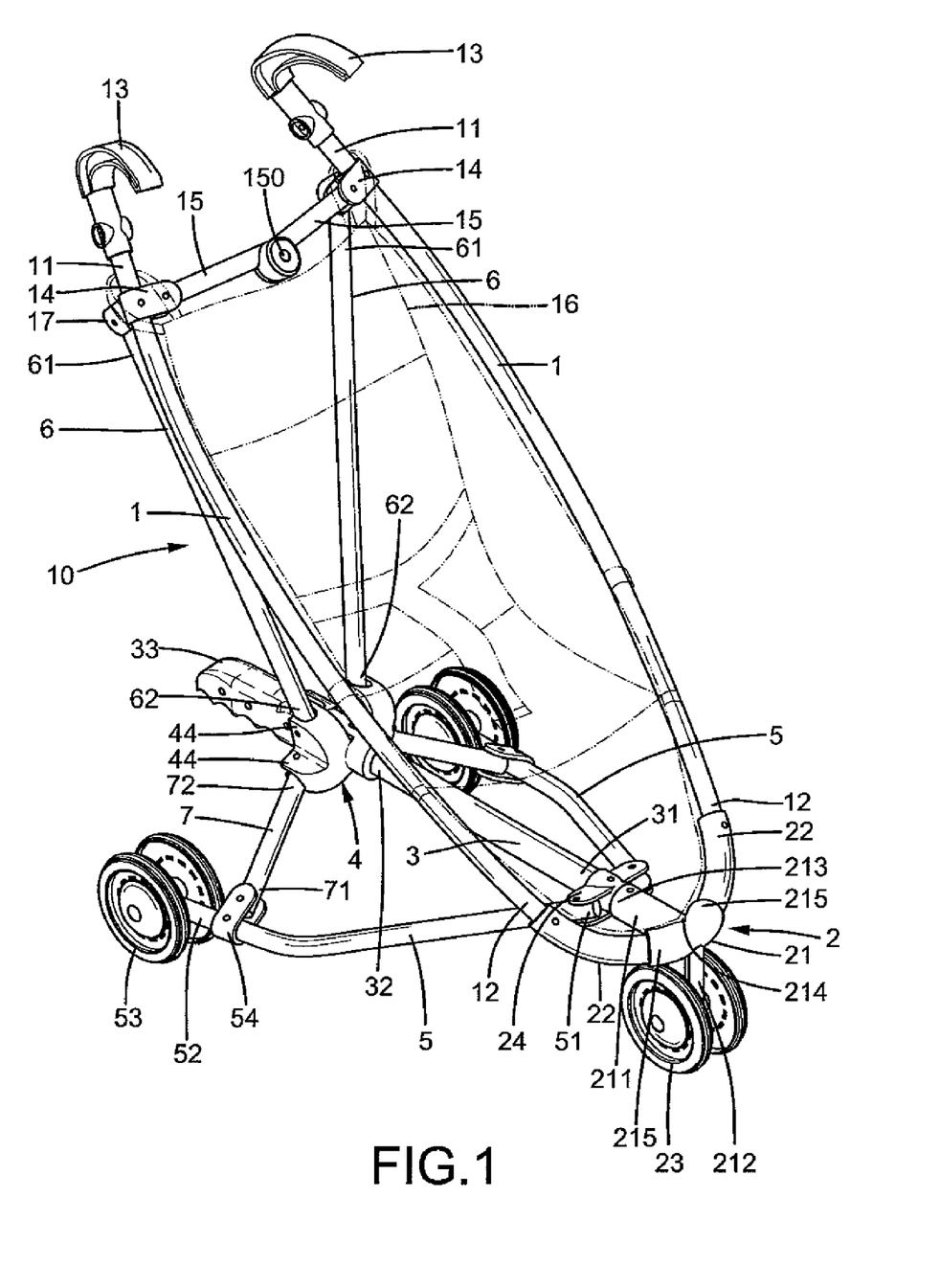
FIG. 1 shows a perspective view of a foldable toy stroller according to the preferred teachings of the present invention with the foldable toy stroller in an extended state.
Figure 2:
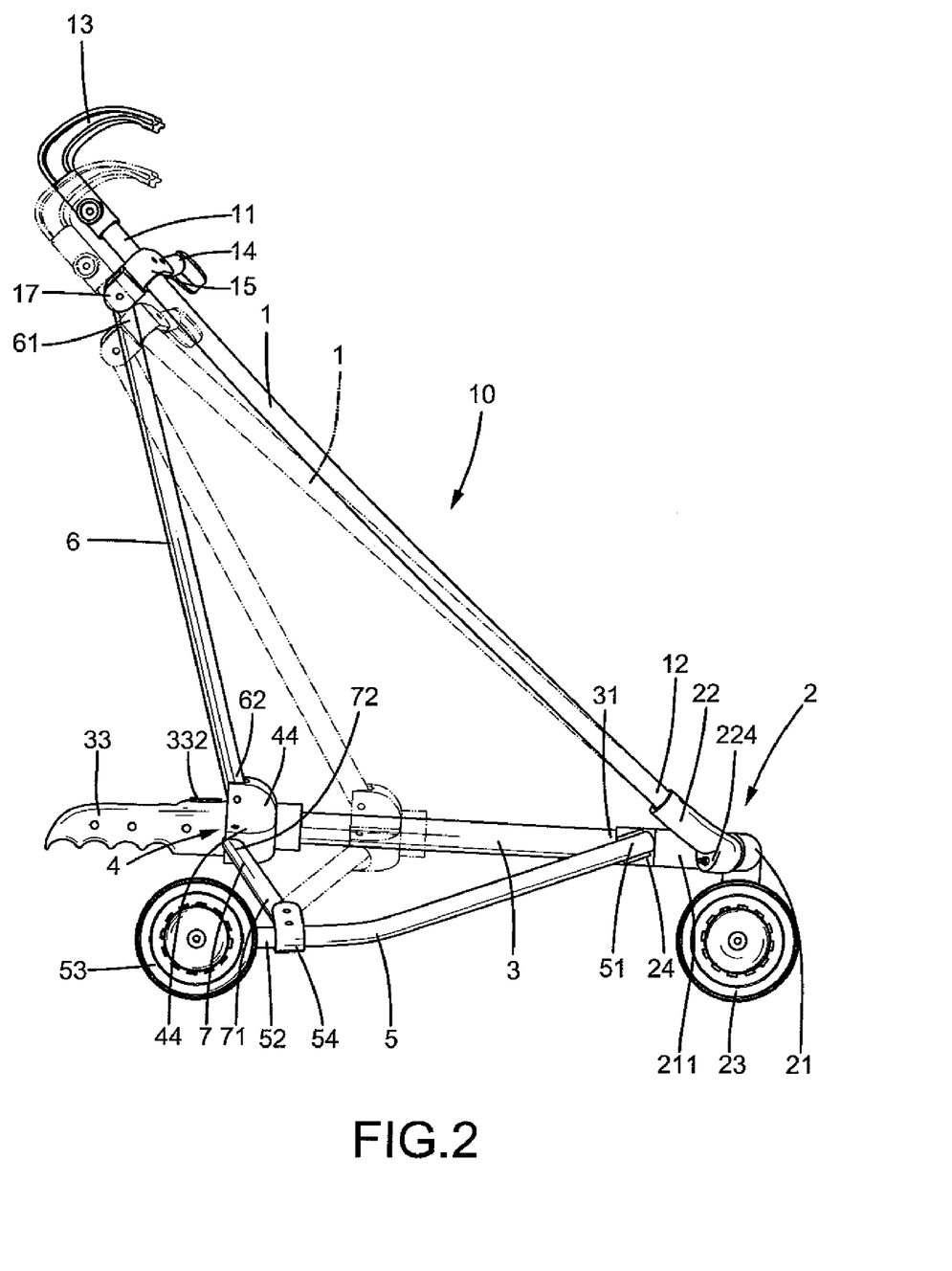
FIG. 2 shows a side view of the foldable toy stroller of FIG. 1.
Figure 3:
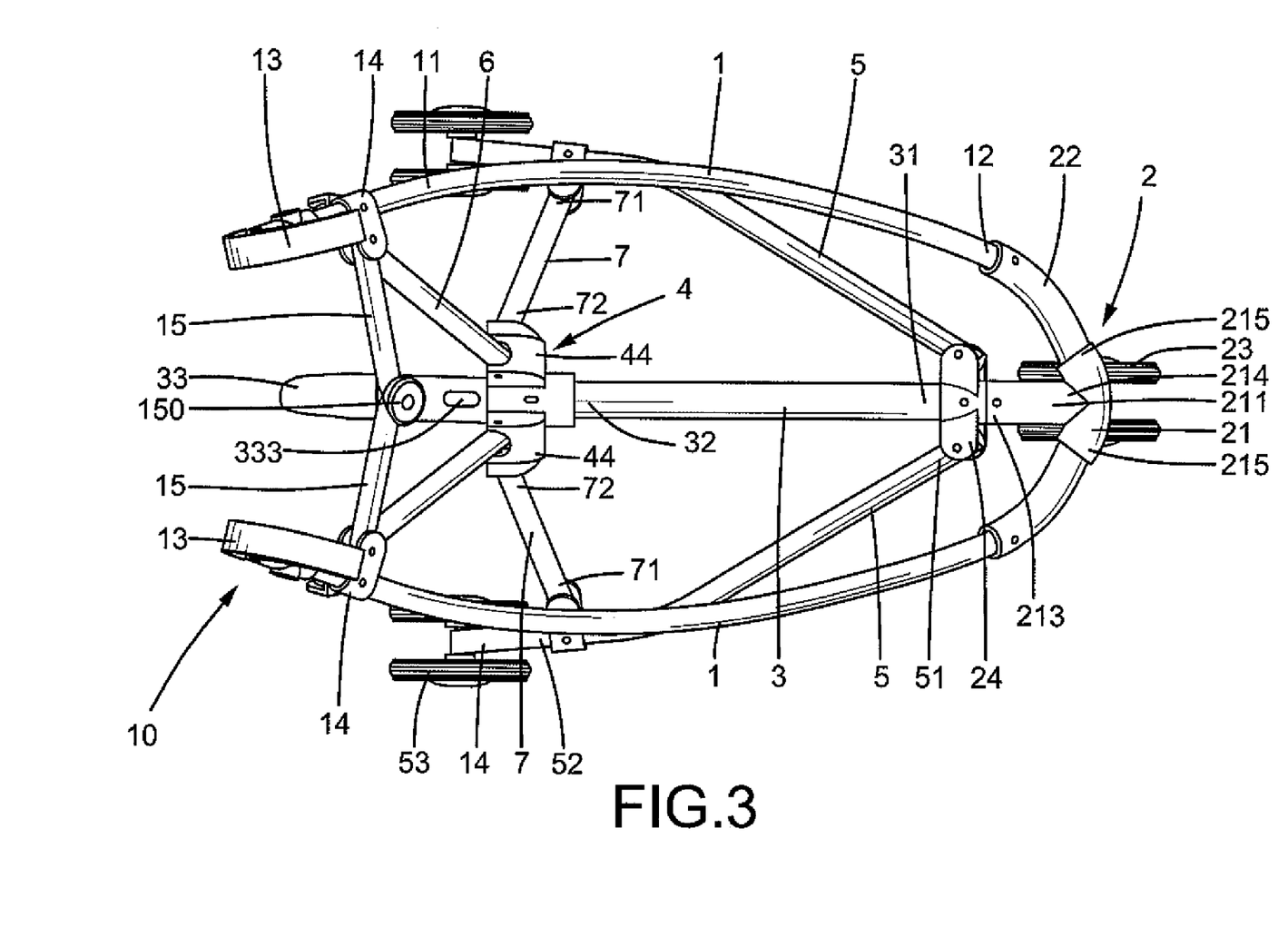
FIG. 3 shows a top view of the foldable toy stroller of FIG. 1
Figure 4:
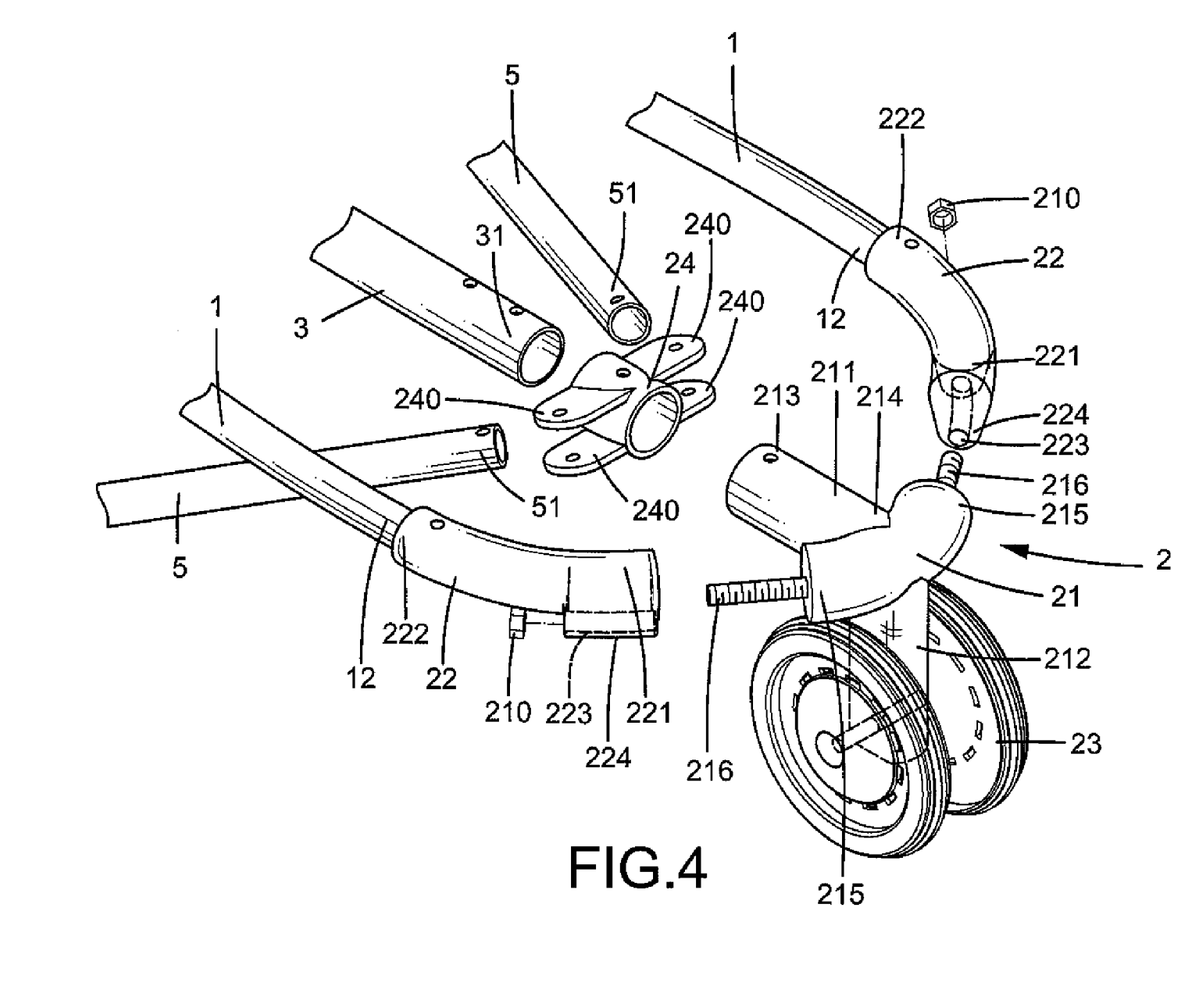
FIG. 4 shows an exploded perspective view of a front portion of the foldable toy stroller of FIG. 1.
Figure 5:
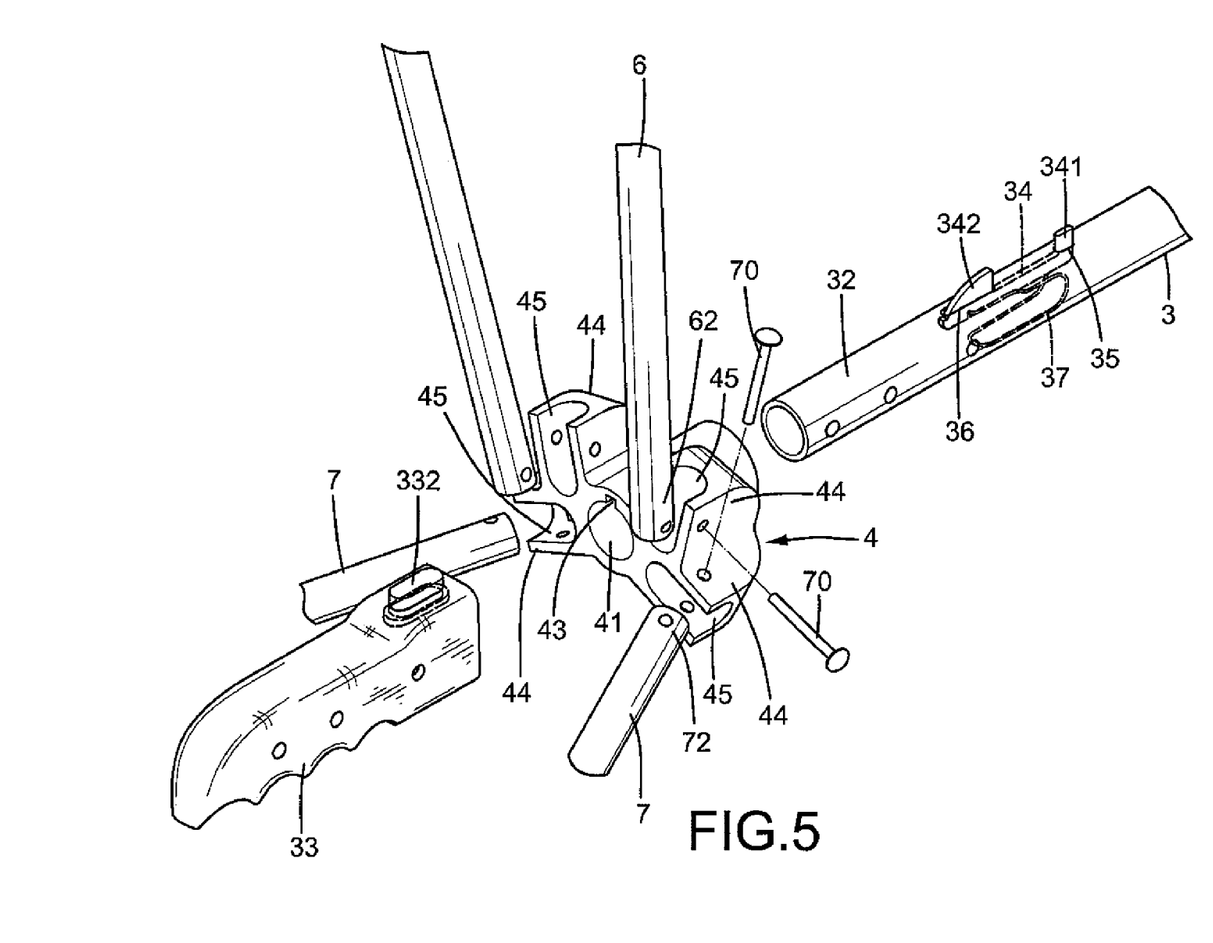
FIG. 5 shows an exploded perspective view of a sliding seat and corresponding components of the foldable toy stroller of FIG. 1.
Figure 6:
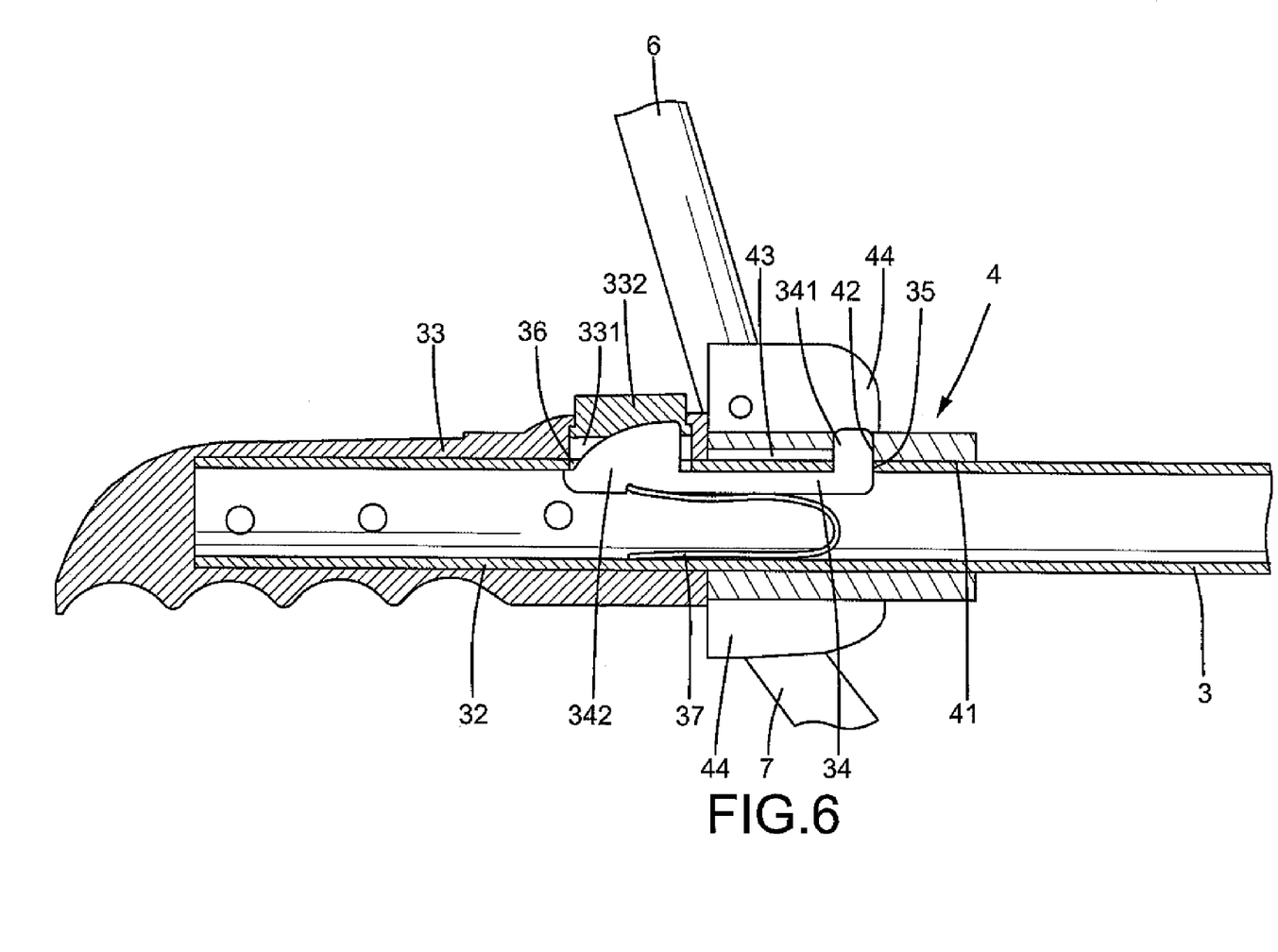
FIG. 6 shows a cross sectional view of the sliding seat and the components of FIG. 5 after assembly.

According to the preferred form, the foldable toy stroller 10 further includes a linking device 2. The linking device 2 includes a front-wheel base 21 and two substantially arc-shaped extension rods 22 respectively on two ends 215 of the front-wheel base 21. A horizontal portion 211 extends horizontally from an intermediate portion of the front-wheel base 21. Specifically, the horizontal portion 211 has a first end 213 and a second end 214 coupled to the front-wheel base 21. A vertical portion 212 extends downward from the intermediate portion of the front-wheel base 21, and a front wheel 23 is attached to a lower end of the vertical portion 212. Each extension rod 22 includes a lower end 221 pivotably connected to one of the ends 215 of the front-wheel base 21. Each extension rod 22 further includes an upper end 222 fixed to a lower end 12 of one of the main rods 1. Thus, the main rods 1 and the extension rods 22 can pivot relative to the front-wheel base 21 (see FIG. 2). In the most preferred form shown, a stud 216 is formed on an end face of each end 215 of the front-wheel base 21. The stud 216 defines a pivot axis in an acute angle with a longitudinal axis of the central rod 3. The lower end 221 of each extension rod 22 includes a protrusion 224 on an outer periphery thereof. The protrusion 224 includes an eccentric through-hole 223 (see FIG. 4) extending in a direction parallel to and spaced from a central portion of the extension rod 22 and rotatably receiving one of the studs 216, and a nut 210 is coupled with the stud 216 for retaining the extension rod 22 while allowing rotational movement of the associated extension rod 22 and the associated main rod 1 about the pivot axis defined by the stud 216. This allows the main rods 1 and the extension rods 22 to move relative to the front-wheel base 21 between an extended position having a larger acute angle with the front-wheel base 21 and a folded position having a small acute angle or substantially coplanar with the front-wheel base 21.

The central rod 3 includes a first end 31 fixed to the first end 213 of the horizontal extension 211 and a second end 32 to which a handle 33 is mounted. In the preferred form shown, a coupler 24 is provided between the first end 31 of the central rod 3 and the first end 213 of the horizontal extension 211. Two pairs of lugs 240 are formed on an outer periphery of the coupler 24. The second end 32 of the central rod 3 includes a first slot 35 and a second slot 36. A locking member 34 is slideably mounted in the second end 32 of the central rod 3 in a direction perpendicular to the longitudinal axis of the central rod 3. The locking member 34 includes a locking portion 341 slideably extending through the first slot 35 and an engaging portion 342 slideably extending through the second slot 36. A spring 37 is mounted in the second end 32 of the central rod 3 for biasing the locking portion 341 and the engaging portion 342 of the locking member 34 to their protruded positions outside the central rod 3. The handle 33 includes an engaging hole 331 for receiving the engaging portion 342 of the locking member 34. A push button 332 is slideably received in the engaging hole 331 and operatively connected to the engaging portion 342 of the locking member 34. The engaging portion 342 of the locking member 34 is received in the engaging hole 331 of the handle 33 to couple the handle 33 to the central rod 3.

Figure 7:
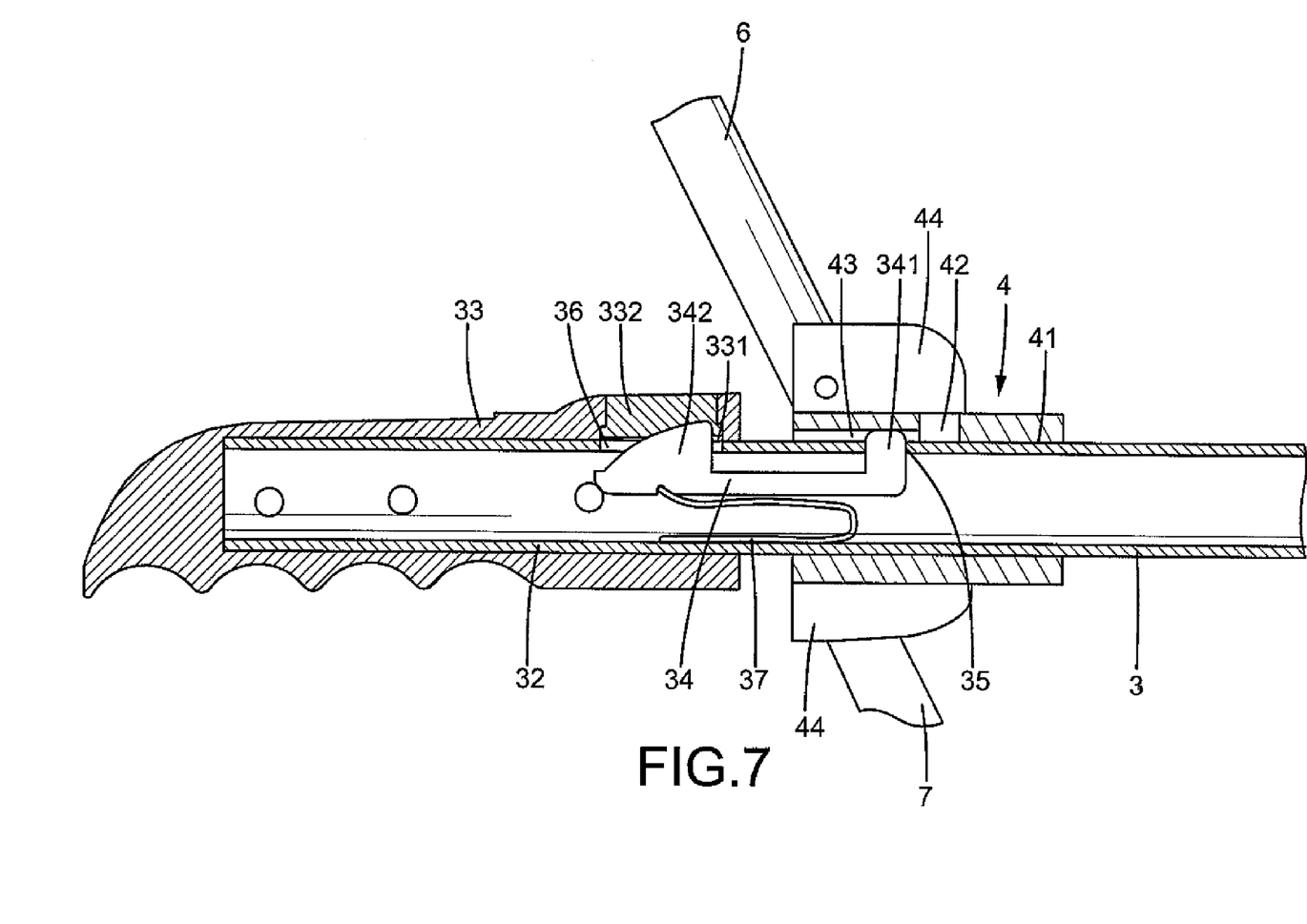
FIG. 7 shows a cross sectional view of the sliding seat and the components of FIG. 5 with a push button pressed and with the sliding seat moved forward.
Figure 8:
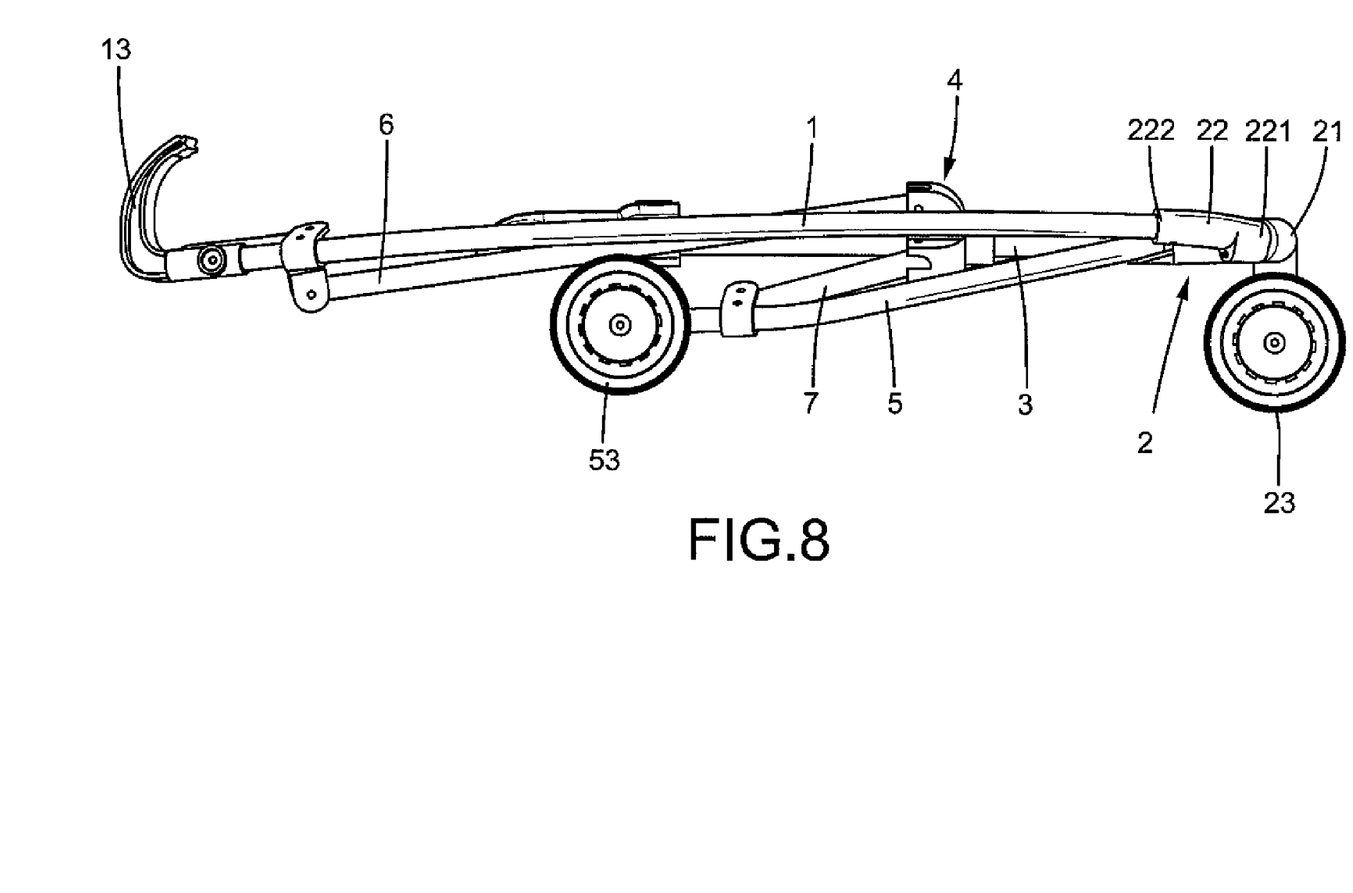
FIG. 8 shows a side view of the foldable toy stroller of FIG. 1 after folding.
Figure 9:
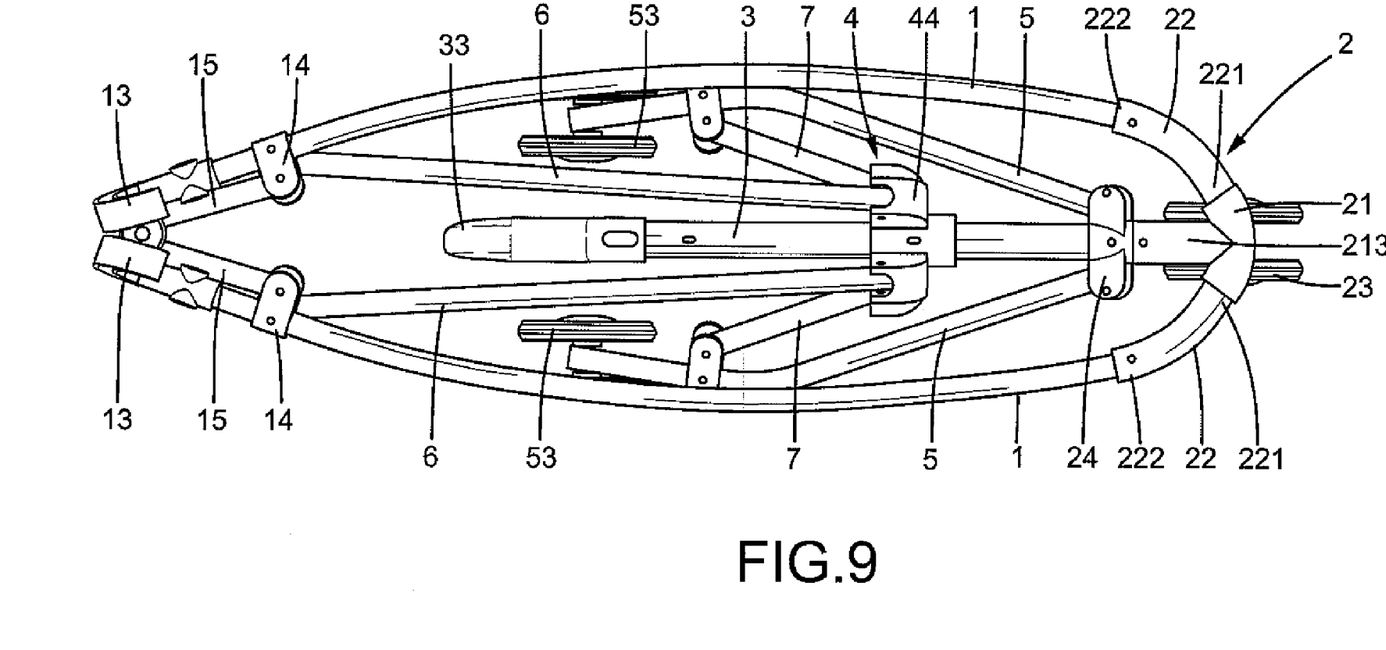
FIG. 9 shows a top view of the foldable toy stroller of FIG. 8.

A sliding seat 4 is slideably mounted on the second end 32 of the central rod 3. In the preferred form shown, the sliding seat 4 includes a longitudinal hole 41 that slideably receives the central rod 3. The sliding seat 4 further includes a positioning hole 42 in a periphery thereof and in communication with and transverse to the longitudinal hole 41. The positioning hole 42 releasably receives the locking portion 341 of the locking member 34. Specifically, when the sliding seat 4 is in a position where the positioning hole 42 of the sliding seat 4 is aligned with the locking portion 341 of the locking member 34, the locking portion 341 of the locking member 34 is moved into the positioning hole 42 of the sliding seat 4 under the action of the spring 37, thereby engaging the sliding seat 4 with the central rod 3. The sliding seat 4 further includes a guiding groove 43 extending in a longitudinal direction parallel to the longitudinal hole 41 and in communication with the positioning hole 42. When the locking portion 341 of the locking member 34 is disengaged from the positioning hole 42, an end portion of the locking portion 341 can slide in the guiding groove 43 when the sliding seat 4 slides (see FIG. 7). The sliding seat 4 further includes four connecting portions 44 each having a compartment 45.

The foldable toy stroller 10 according to the preferred teachings of the present invention further includes a pair of struts 6 each including a lower end 62 pivotably received in the compartment 45 of one of the connecting portions 44. Each strut 6 further includes an upper end 61 pivotably connected to a coupler 17 mounted to the upper end 11 of one of the main beams 1. Each strut 6 is pivotable toward or away from the central rod 3 substantially in a plane parallel to the longitudinal axis of the central rod 3 to allow folding/unfolding operation.

The foldable toy stroller 10 according to the preferred teachings of the present invention further includes a pair of rear wheel support rods 5 each including a first end 51 pivotally received between a pair of lugs 240 on the coupler 24. Each rear wheel support rod 5 further includes a second end 52 to which a rear wheel 53 is mounted. A coupler 54 is mounted on the second end 52 of each rear wheel support rod 5 for pivotable connection with a first end 71 of a connecting rod 7 whose second end 72 is pivotably received in the compartment 45 of one of the connecting portions 44. Thus, the rear wheel support rods 5 may pivot toward or away from the central rod 3 to allow folding/unfolding operation. Similarly, the connecting rods 7 may pivot toward or away from the central rod 3 to allow folding/unfolding operation. Namely, each of the rear wheel support rods 5 and the connecting rods 7 is pivotable away from the central rod 3 for unfolding operation or toward the central rod 3 for folding operation.

When the foldable toy stroller 10 according to the preferred teachings of the present invention is in its extended state, the sliding seat 4 is in a position where the positioning hole 42 of the sliding seat 4 is aligned with the locking portion 341 of the locking member 34, the locking portion 341 of the locking member 34 is moved into the positioning hole 42 of the sliding seat 4 under the action of the spring 37, thereby fixing the sliding seat 4 on the central rod 3. Meanwhile, the struts 6 are at a small acute angle with a vertical plane orthogonal to the longitudinal axis of the central rod 3 to stretch the upper ends 11 of the main rods 1 upward whereas the links 15 are collinear to stretch the upper ends 11 of the main rods 1 outward. Furthermore, the connecting rods 7 are away from the central rod 3 and away from each other and, thus, stretch the rear wheel support rods 5 away from the central rod 3. The frame thus formed has a strong structure to assure safety.

When folding of the foldable toy stroller 10 according to the preferred teachings is required, the push button 332 on the handle 33 is pressed to disengage the locking portion 332 of the locking member 34 from the positioning hole 42 of the sliding seat 4, unlocking engagement between the central rod 3 and the sliding seat 4. Then the sliding seat 4 is slid toward the first end 31 of the central rod 3, which causes the lower ends 62 of the struts 6 and the second ends 72 of the connecting rods 7 move forward together with the sliding seat 4. Meanwhile, the struts 6 pivot downward to a position at a small acute angle with the longitudinal axis of the central rod 3. The connecting rods 7 and the rear wheel support rods 5 pivot toward the central rod 3. The outer ends of the links 15 pivot inward toward each other. Furthermore, the downward pivotal movements of the struts 6 cause the main rods 1 and the extension rods 22 to pivot inward toward each other about the pivot axes defined by the studs 216 and downward toward the central rod 3. Thus, both the width and the height of the folded stroller 10 according to the preferred teachings of the present invention are reduced with simple folding operation, allowing easy storage and transport.

The angle between the central rod 3 and the struts 6 in the extended state and the folded state may vary. Furthermore, the extending planes of the struts 6, the connecting rods 7, the rear wheel support rods 5, the extension rods 22, and the main rods 1 may vary according to product needs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. A foldable toy stroller comprising:
   two main rods each including an upper end and a lower end;
   a front-wheel base including two ends;
   two extension rods each including an upper end mounted to the lower end of one of the main rods and a lower end rotatably connected to one of the ends of the front-wheel base;
   a central rod including a first end connected to the front-wheel base and a second end, a locking member being mounted in the second end of the central rod and including a locking portion;
   a sliding seat slideably mounted on the central rod and including a positioning hole for receiving the locking portion of the locking member;
   two rear wheel support rods each including a first end pivotably connected to the front wheel base and a second end to which a rear wheel is mounted;
   two struts each including an upper end pivotably connected to the upper end of one of the main rods and a lower end pivotably connected to the sliding seat; and
   two connecting rods each including a first end pivotably connected to one of the rear wheel support rods and a second end pivotably connected to the sliding seat, with each of the rear wheel support rods and the connecting rods being pivotable away from the central rod for unfolding the foldable toy stroller or toward the central rod for folding the foldable toy stroller,
   with the locking portion of the locking member being engaged in the positioning hole of the sliding seat when the foldable toy stroller is in an extended state, with the struts being away from the central rod and stretching the main rods upward, and with the connecting rods being away from the central rod and stretching the rear wheel support rods outward away from the central rod, and
   with the sliding seat being slidable on the central rod when the locking portion of the locking member is disengaged from the positioning hole of the sliding seat, allowing the main rods, the rear wheel support rods, the struts, and the connecting rods to pivot toward the central rod for folding the foldable toy stroller.

2. The foldable toy stroller as claimed in claim 1, further comprising, in combination: a coupler mounted, on the upper end of each of the main rods; and two links mounted between the main rods and each including an inner end and an outer end, with the inner ends of the links being pivotably connected together, and with the outer ends of the links being respectively and pivotably connected to the couplers.

3. The foldable toy stroller as claimed in claim 1, with the sliding seat further including four connecting portions to which the lower ends of the struts and the second ends of the connecting rods are pivotably connected.

4. The foldable toy stroller as claimed in claim 1, with the sliding seat including a longitudinal hole that slideably receives the central rod, with the positioning hole of the sliding seat being in communication with and transverse to the longitudinal hole, with the sliding seat further including a guiding groove extending parallel to the longitudinal hole and in communication with the positioning hole, and with the locking portion being slideable in the guiding groove when the sliding seat is slideable on the central rod.

5. The foldable toy stroller as claimed in claim 1, the locking member further including an engaging portion, with the central rod including a first slot in a periphery thereof through which the locking portion of the locking member extends, with the central rod further including a second slot in the periphery thereof through which the engaging portion of the locking member extends, with the foldable toy stroller further comprising, in combination: a handle mounted to the second end of the central rod and including an engaging hole for receiving the engaging portion of the locking member; and a spring mounted in the central rod for biasing the locking portion and the engaging portion of the locking member to respectively engage with the positioning hole of the sliding seat and the engaging hole of the handle, with the handle further including a push button slideably received in the engaging hole of the handle and pressable to disengage the engaging portion of the locking member from the engaging hole of the handle and to disengage the locking portion of the locking member from the positioning hole of the sliding seat to allow sliding movement of the sliding seat along the central rod.

6. The foldable toy stroller as claimed in claim 1, with the front-wheel base including a vertical portion extending downward from an intermediate portion between the ends of the front-wheel base, with a front wheel being attached to the vertical portion, with the front-wheel base further including a horizontal portion extending horizontally from the intermediate portion and including an end to which a coupler is mounted, and with first end of the central rod being coupled to the coupler.

7. The foldable toy stroller as claimed in claim 6, with each of the ends of the front-wheel base including a stud extending outward from an end face thereof and at an acute angle with a longitudinal axis of the central rod, with the lower end of each of the extension rods including an eccentric hole parallel to and spaced from a central portion thereof and rotatably receiving the lower end of one of the extension rods, and with each of the studs defining a rotating axis for the lower end of one of the extension rods.

8. The foldable toy stroller as claimed in claim 6, with the coupler including two pairs of lugs on an outer periphery thereof, and with the front end of each of the rear wheel support rods being pivotably received between one of the pairs of lugs.

9. The foldable toy stroller as claimed in claim 6, with the sliding seat including a longitudinal hole that slideably receives the central rod, with the positioning hole of the sliding seat being in communication with and transverse to the longitudinal hole, with the sliding seat further including a guiding groove extending parallel to the longitudinal hole and in communication with the positioning hole, and with the locking portion being slideable in the guiding groove when the sliding seat is slideable on the central rod.

* * * * *